(12) United States Patent
Wang

(10) Patent No.: US 11,535,382 B2
(45) Date of Patent: Dec. 27, 2022

(54) OVERHEAD FLOW DISTRIBUTION ASSEMBLY FOR AIRCRAFT CABIN

(71) Applicant: MHI RJ Aviation ULC, Vancouver (CA)

(72) Inventor: Hongzhi Wang, Saint-Laurent (CA)

(73) Assignee: MHI RJ Aviation ULC, Vancouver (CA)

( * ) Notice: Subject to any disclaimer, the term of this patent is extended or adjusted under 35 U.S.C. 154(b) by 273 days.

(21) Appl. No.: 16/772,508

(22) PCT Filed: Dec. 13, 2018

(86) PCT No.: PCT/CA2018/051592
§ 371 (c)(1),
(2) Date: Jun. 12, 2020

(87) PCT Pub. No.: WO2019/119115
PCT Pub. Date: Jun. 27, 2019

(65) Prior Publication Data
US 2020/0385129 A1  Dec. 10, 2020

Related U.S. Application Data

(60) Provisional application No. 62/607,043, filed on Dec. 18, 2017.

(51) Int. Cl.
*B64D 13/00* (2006.01)
*B64D 13/06* (2006.01)

(52) U.S. Cl.
CPC ...... *B64D 13/06* (2013.01); *B64D 2013/0625* (2013.01)

(58) Field of Classification Search
CPC .............................. B64D 13/06; B64D 13/00; B64D 2013/0625; B64D 2013/003; F24F 7/04; F24F 13/072
See application file for complete search history.

(56) References Cited

U.S. PATENT DOCUMENTS

| | | | | |
|---|---|---|---|---|
| 3,687,054 A | * | 8/1972 | Boberg | B64D 13/00 454/76 |
| 4,819,548 A | * | 4/1989 | Horstman | B64D 13/00 454/76 |

(Continued)

FOREIGN PATENT DOCUMENTS

| | | |
|---|---|---|
| CA | 2975775 A1 | 9/2016 |
| DE | 69219320 T2 | 9/1997 |

(Continued)

OTHER PUBLICATIONS

Extended European Search Report in corresponding European Application No. 18892567.1, dated Aug. 12, 2021 (12 pages).

(Continued)

*Primary Examiner* — Phutthiwat Wongwian
*Assistant Examiner* — Sherman D Manley
(74) *Attorney, Agent, or Firm* — Osha Bergman Watanabe & Burton LLP

(57) ABSTRACT

An overhead flow distribution assembly for an aircraft cabin, including a conduit defining a plenum having an inlet, upper outlets and lower outlets, the upper outlets spaced apart from each other along a longitudinal direction of the aircraft, the lower outlets spaced apart from each other along the longitudinal direction, the inlet being located between the upper outlets and the lower outlets, and a baffle extending within the plenum along the longitudinal direction, the baffle being located between the upper outlets and at least part of the inlet along a transverse direction normal to the longitudinal direction, the baffle having openings defined therethrough, the baffle configured to restrict airflow from the at least part of the inlet toward the upper outlets. A method of balancing a flow in an overhead flow distribution assembly for an aircraft cabin is also discussed.

14 Claims, 7 Drawing Sheets

(56) References Cited

U.S. PATENT DOCUMENTS

| | | | |
|---|---|---|---|
| 5,054,379 A | 10/1991 | Sodec | |
| 6,802,361 B2* | 10/2004 | Hatanaka | F24F 1/0047 |
| | | | 165/53 |
| 9,334,054 B2 | 5/2016 | Hashberger et al. | |
| 9,581,163 B2* | 2/2017 | Rivera | B64D 13/06 |
| 9,725,178 B2* | 8/2017 | Wang | G06F 30/15 |
| 11,267,572 B2* | 3/2022 | Vandyke | B64D 13/06 |
| 2009/0061754 A1* | 3/2009 | Hlavka | B64D 13/00 |
| | | | 454/152 |
| 2016/0377313 A1* | 12/2016 | Leiterman | F24F 13/0236 |
| | | | 138/119 |

FOREIGN PATENT DOCUMENTS

| | | |
|---|---|---|
| DE | 19722554 A1 | 12/1998 |
| EP | 0292033 A2 | 11/1988 |
| EP | 0292033 A3 | 11/1989 |
| FR | 2915272 A1 | 10/2008 |
| JP | S55079952 A | 6/1980 |

OTHER PUBLICATIONS

Abstract Translation corresponding to JP S55-079952A, dated Jun. 16, 1980 (1 page).

International Searching Authority, PCT International Search Report and Written Opinion re: International Patent Application No. PCT/CA2018/051592, dated Mar. 5, 2019.

English translation of German patent document No. DE 19722554 dated Dec. 3, 1998, https://patents.google.com/patent/DE19722554A1/en?oq=DE19722554, accessed on Jan. 21, 2020.

English translation of France patent document No. FR 2915272 dated Oct. 24, 2008, https://patents.google.com/patent/FR2915272A1/en?oq=FR+2915272A1, accessed on Jan. 21, 2020.

\* cited by examiner

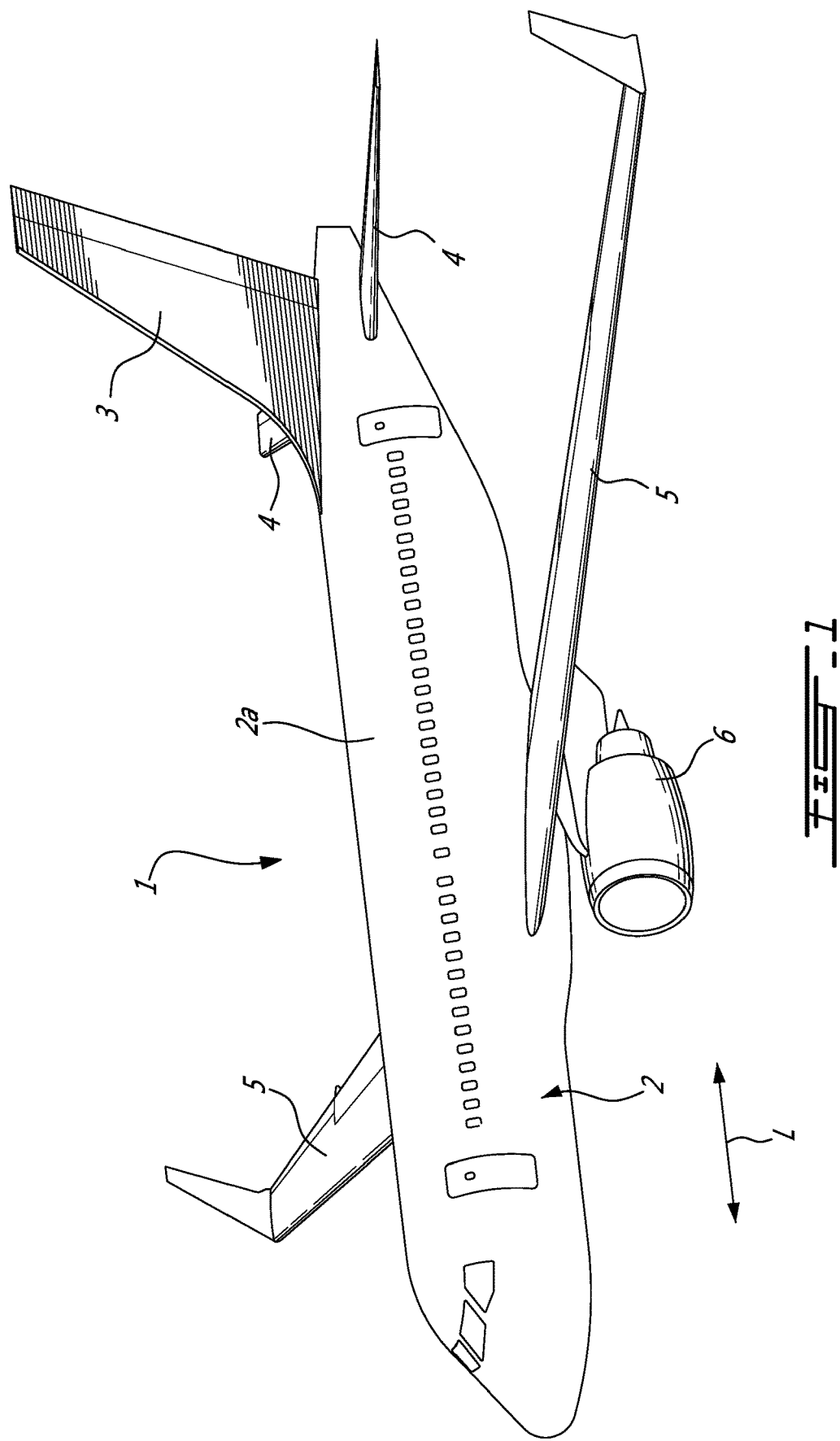

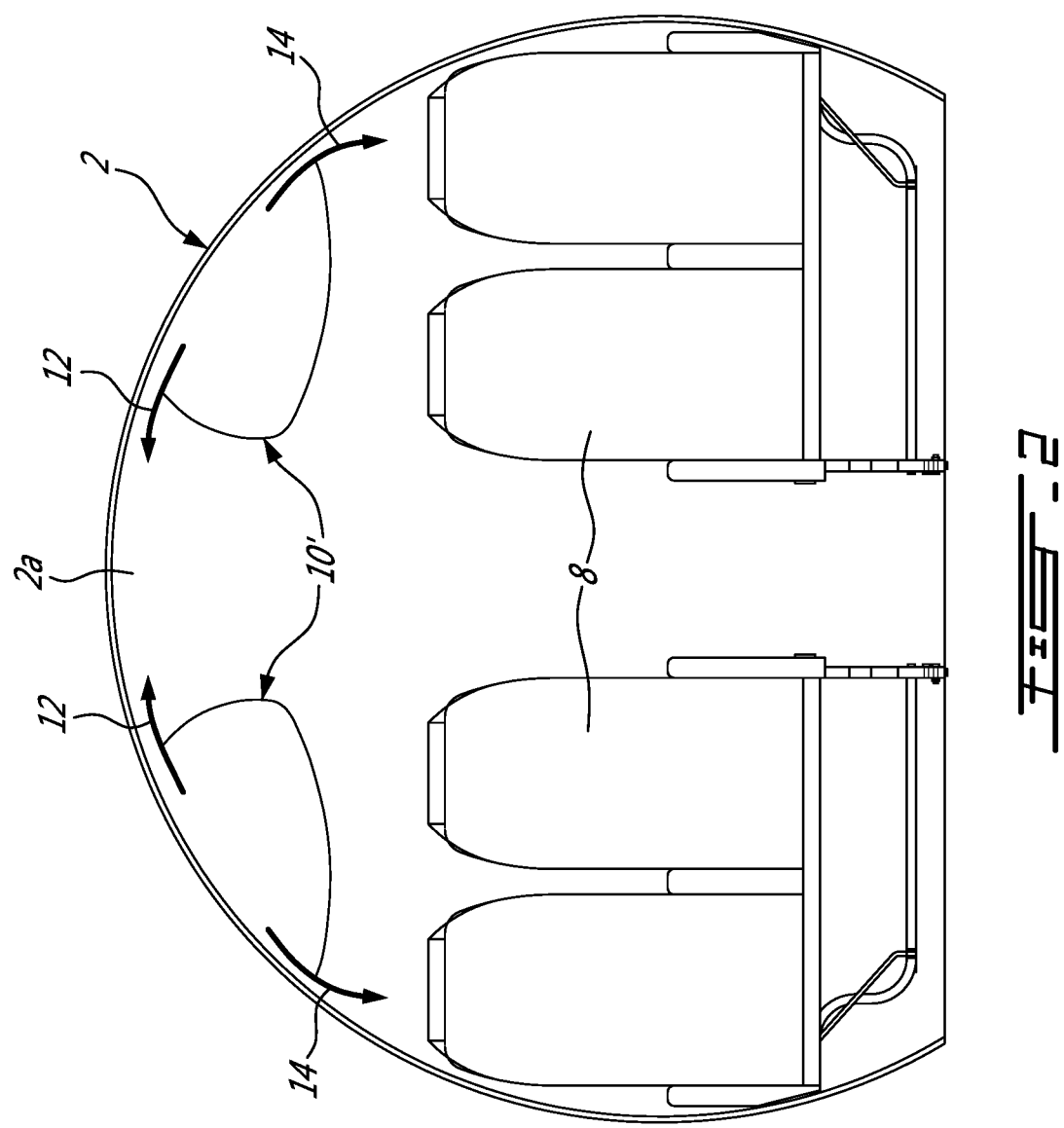

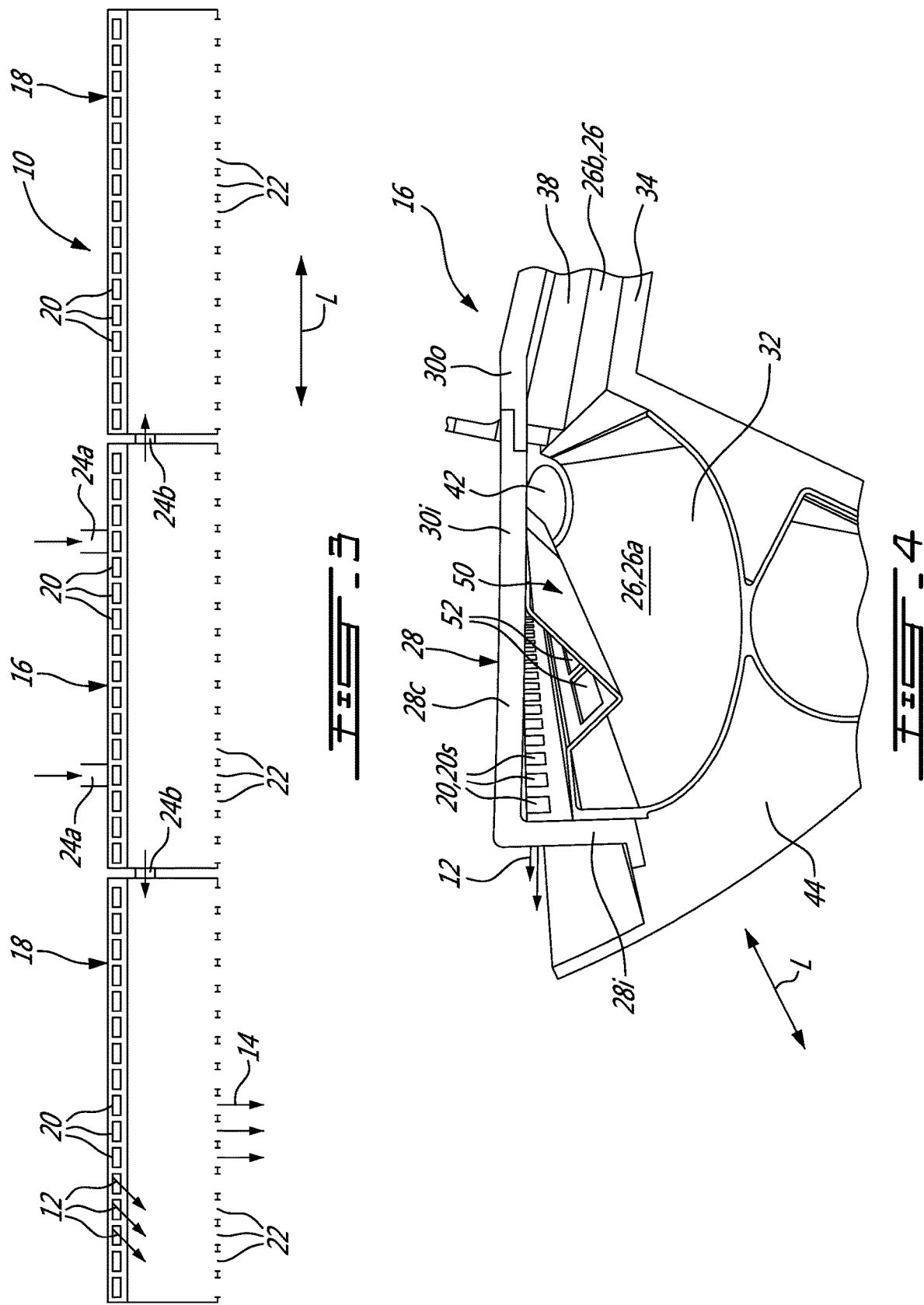

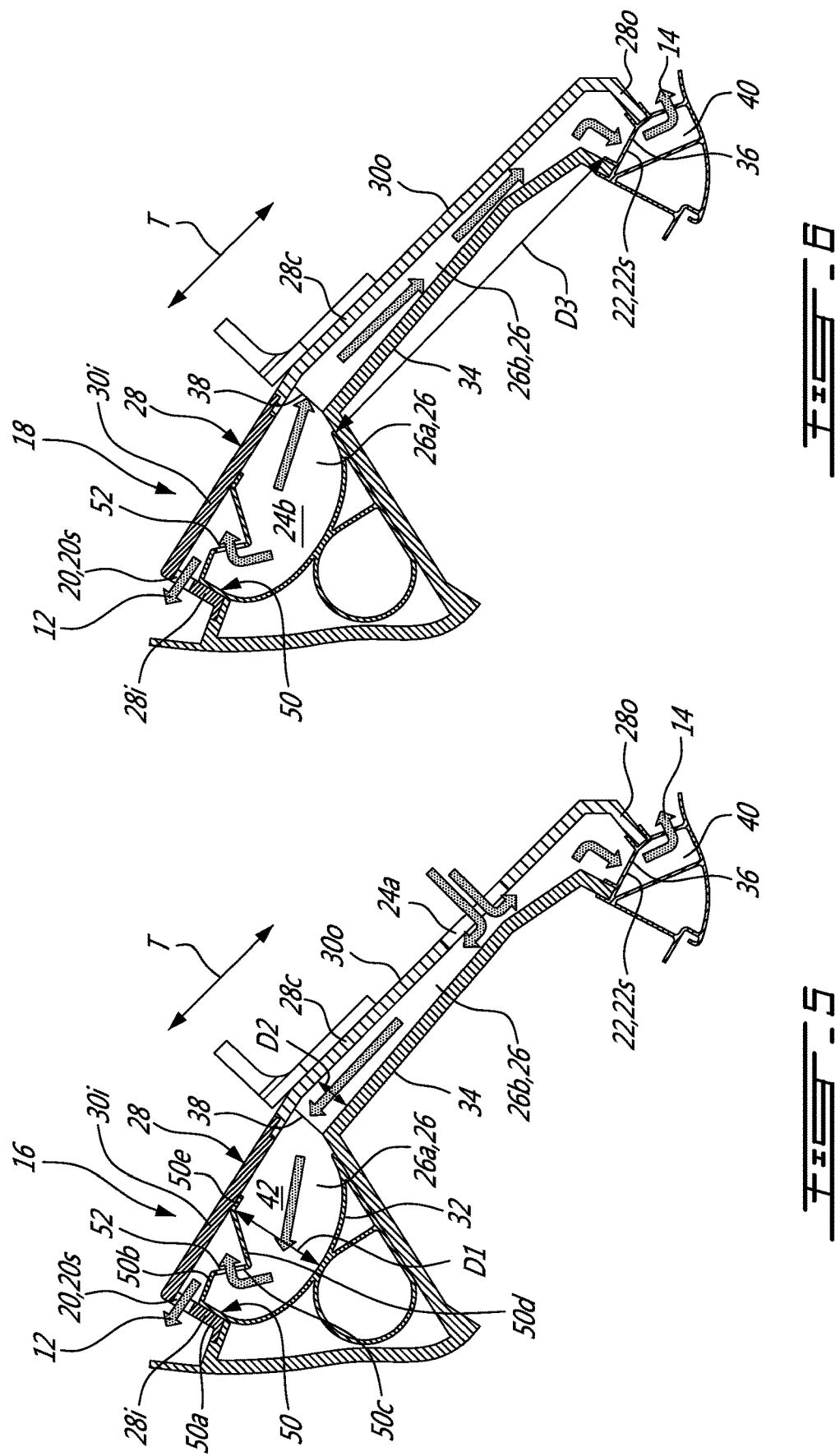

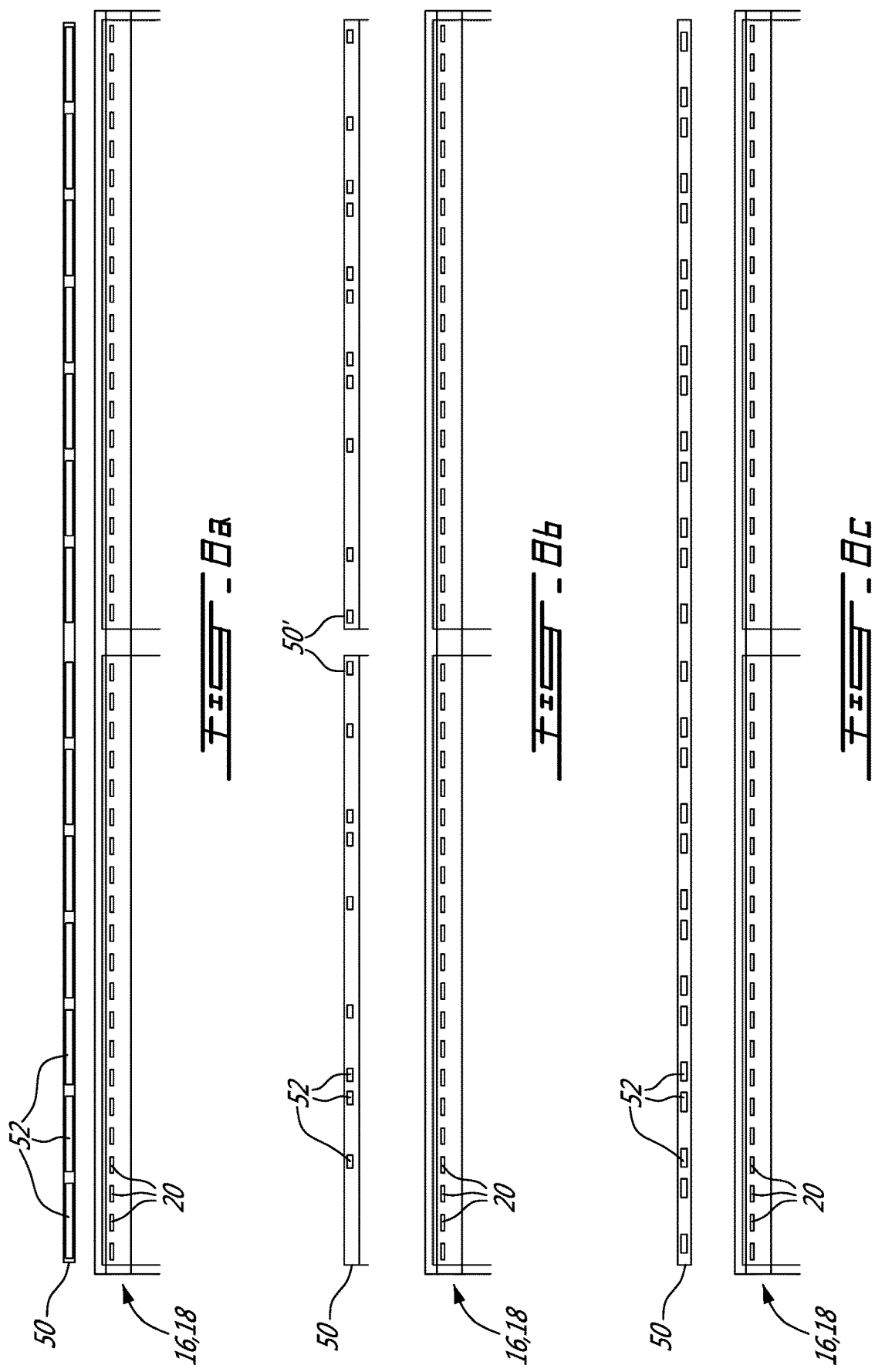

OVERHEAD FLOW DISTRIBUTION ASSEMBLY FOR AIRCRAFT CABIN

CROSS-REFERENCE TO RELATED APPLICATION(S)

This application is a national phase application under 35 U.S.C. 371 of International Patent Application No. PCT/CA2018/051592 filed on Dec. 13, 2018, which claims priority from U.S. Provisional Patent Application Ser. No. 62/607,043 filed on Dec. 18, 2017, the entire content of which is incorporated herein by reference.

TECHNICAL FIELD

The application relates generally to airflow distribution within an aircraft cabin, and, more particularly, to overhead flow distribution assemblies provided for example in overhead bins, valences, etc.

BACKGROUND OF THE ART

Aircraft cabin airflow distribution systems must meet flow balance requirements, for example in relation to the split between overhead airflow directed toward the sitting passengers and overhead flow directed toward the upper portion of the cabin and/or aisle between seats. Such requirements may be dictated by certification authorities, desirable comfort conditions, health considerations, etc.

Flow distribution systems are typically configured for a particular cabin interior design. Accordingly, when the cabin interior is redesigned, the flow distribution system may need to be redesigned as well so as to be able to maintain the flow balance requirements. Redesign of a flow distribution system creates additional costs, and requires additional time for testing and adjustment, which are added to the costs and time of the cabin interior design, and which may be undesirable.

SUMMARY

In one aspect, there is provided an overhead flow distribution assembly for an aircraft cabin, the assembly comprising: a conduit defining a plenum having an inlet, upper outlets and lower outlets, the upper outlets spaced apart from each other along a longitudinal direction of the aircraft, the lower outlets spaced apart from each other along the longitudinal direction, the inlet being located between the upper outlets and the lower outlets; and a baffle extending within the plenum along the longitudinal direction, the baffle being located between the upper outlets and at least part of the inlet along a transverse direction normal to the longitudinal direction, the baffle having openings defined therethrough, the baffle configured to restrict airflow from the at least part of the inlet toward the upper outlets.

In particular embodiments, the assembly may include any one or any suitable combination of the following:
  the upper outlets are defined by a first array of slots through a first wall extending along the longitudinal direction, and the lower outlets are defined by a second array of slots through a second wall extending along the longitudinal direction;
  the plenum includes a first portion adjacent the upper outlets and a second portion extending from the first portion to the lower outlets, the second portion defining a flow restriction with respect to the first portion, the baffle extending within the first portion;
  the inlet is defined by at least one opening through a wall of the conduit, the wall extending along the longitudinal direction, the inlet in direct fluid communication with the second portion;
  the conduit has two opposed ends spaced apart along the longitudinal direction, one of the opposed ends including the inlet;
  a first distance measured along the transverse direction between the upper outlets and the inlet is smaller than a second distance measured along the transverse direction between the lower outlets and the inlet;
  the baffle has an end extending across the inlet;
  an end wall extends transversely to the longitudinal direction and is connected to the end of the baffle, the end wall obstructing part of the inlet;
  the conduit is a first conduit, the inlet defined by at least one opening through a wall of the first conduit, the wall extending along the longitudinal direction, the first baffle located between the upper outlets and the inlet. The assembly further comprises: a second conduit extending adjacent the first conduit along the longitudinal direction, the second conduit defining a second plenum having a second inlet, second upper outlets and second lower outlets, the second upper outlets spaced apart from each other along the longitudinal direction, the second lower outlets spaced apart from each other along the longitudinal direction, the second inlet being located between the second upper outlets and the second lower outlets, the second inlet located in an end of the second conduit adjacent the first conduit and defining a fluid communication between the plenum of the first conduit and the second plenum; and a second baffle extending along the longitudinal direction within the second plenum, the second baffle being located between the second upper outlets and at least part of the second inlet along the transverse direction, the second baffle having openings defined therethrough and being configured to restrict airflow from the second inlet toward the second upper outlets;
  the second baffle has an end extending across the second inlet, the second baffle further comprising an end wall extending transversely to the longitudinal direction and connected to the end of the second baffle, the end wall obstructing part of the second inlet;
  the assembly further comprises a third conduit, the first conduit being located between the second and third conduits along the longitudinal direction, the third conduit defining a third plenum having a third inlet, third upper outlets and third lower outlets, the third upper outlets spaced apart from each other along the longitudinal direction, the third lower outlets spaced apart from each other, the third inlet being located between the third upper outlets and the third lower outlets along the transverse direction, the third inlet being located in an end of the third conduit adjacent the first conduit and defining a fluid communication between the plenum of the first conduit and the third plenum; and a third baffle extending along the longitudinal direction within the third plenum, the third baffle being located between the third upper outlets and at least part of the third inlet along the transverse direction, the third baffle having openings defined therethrough and being configured to restrict an airflow from the third inlet toward the third upper outlets.

In another aspect, there is provided an overhead flow distribution assembly for an aircraft cabin, the assembly comprising: a conduit having a plurality of interconnected walls including longitudinal walls configured to extend along a longitudinal direction of the aircraft and opposed end walls spaced apart along the longitudinal direction, the interconnected walls cooperating to define a plenum, one of the interconnected walls having an inlet defined therethrough in fluid communication with the plenum, the longitudinal walls including first and second longitudinal walls spaced apart from each other along a transverse direction normal to the longitudinal direction, the inlet being located between the first and second longitudinal walls, the first longitudinal wall having a first plurality of slots defined therethrough defining upper outlets in fluid communication with the plenum, the second longitudinal wall having a second plurality of slots defined therethrough defining lower outlets in fluid communication with the plenum; and a baffle defining a longitudinally extending partition in the plenum, the upper outlets being located on one side of the partition, the lower outlets and at least part of the inlet being located on an opposed side of the partition, the baffle having openings defined therethrough, the baffle configured to restrict an airflow from the at least part of the inlet toward the upper outlets.

In particular embodiments, the assembly may include any one or any suitable combination of the following:
the baffle is connected to the first longitudinal wall and to a third one of the longitudinal walls located between the first and second longitudinal wall;
the inlet is defined by at least one opening through the third longitudinal wall;
the inlet is defined by at least one opening through one of the opposed end walls;
the baffle has an end extending across the inlet;
a baffle end wall extends transversely to the longitudinal direction and is connected to the end of the baffle, the baffle end wall obstructing part of the inlet;
the plenum includes a first portion adjacent the upper outlets and a second portion extending from the first portion to the lower outlets, the second portion defining a flow restriction with respect to the first portion, the baffle extending within the first portion.

In another aspect, there is provided a method of balancing a flow in an overhead flow distribution assembly for an aircraft cabin, the method comprising: providing a conduit having upper and lower outlets and a baffle extending within the conduit between the upper outlets and lower outlets, including locating the baffle to extend between the upper outlets and at least part of an inlet of the conduit; generating an airflow into the conduit via the inlet so as to create a flow through openings in the baffle and out of the upper and lower outlets; measuring an output flow out of at least one of the upper outlets and the lower outlets; comparing the measured output flow to a corresponding desired output flow; and based on the comparison, selectively blocking at least part of one or more of the openings of the baffle such as to reduce a difference between the measured output flow and the desired output flow.

In a particular embodiment, the conduit is a secondary conduit and the baffle is located with an end extending across the inlet, generating the airflow into the secondary conduit is performed via a primary conduit in fluid communication with the inlet and also having upper and lower outlets, and the method further comprises: measuring a flow from the primary conduit through the inlet of the secondary conduit; comparing the measured flow through the inlet to a desired flow through the inlet; and based on the comparison, selectively blocking part of the inlet with a wall attached to the baffle end such as to reduce a difference between the measured flow through the inlet and the desired flow through the inlet.

DESCRIPTION OF THE DRAWINGS

For a better understanding of the present invention, as well as other aspects and further features thereof, reference is made to the following description which is to be used in conjunction with the accompanying drawings, where:

FIG. 1 is a schematic tridimensional view of an aircraft;

FIG. 2 is a schematic front cross-sectional view of a cabin of an aircraft such as shown in FIG. 1, showing an example of flow distribution assemblies;

FIG. 3 is a schematic side view of a flow distribution assembly which may be used in a cabin such as shown in FIG. 2, in accordance with a particular embodiment;

FIG. 4 is a schematic front end view of a primary conduit of the flow distribution assembly of FIG. 3, in accordance with a particular embodiment;

FIG. 5 is a schematic front cross-sectional view of the primary conduit of FIG. 4;

FIG. 6 is a schematic front cross-sectional view of a secondary conduit of the flow distribution assembly of FIG. 3, in accordance with a particular embodiment;

FIG. 8a is a schematic representation of a baffle opening configuration with respect to upper outlets in a conduit such as shown in FIG. 4-6 in an initial step of the method of FIG. 7, in accordance with a particular embodiment, with the baffle and upper outlets being illustrated in an exploded configuration for ease of reference;

FIGS. 8b-8c are schematic representations of different baffle opening configurations with respect to upper outlets in a conduit such as shown in FIG. 4-6 after the method of FIG. 7, in accordance with particular embodiments, with the baffle and upper outlets being illustrated in an exploded configuration for ease of reference;

Figure 7:
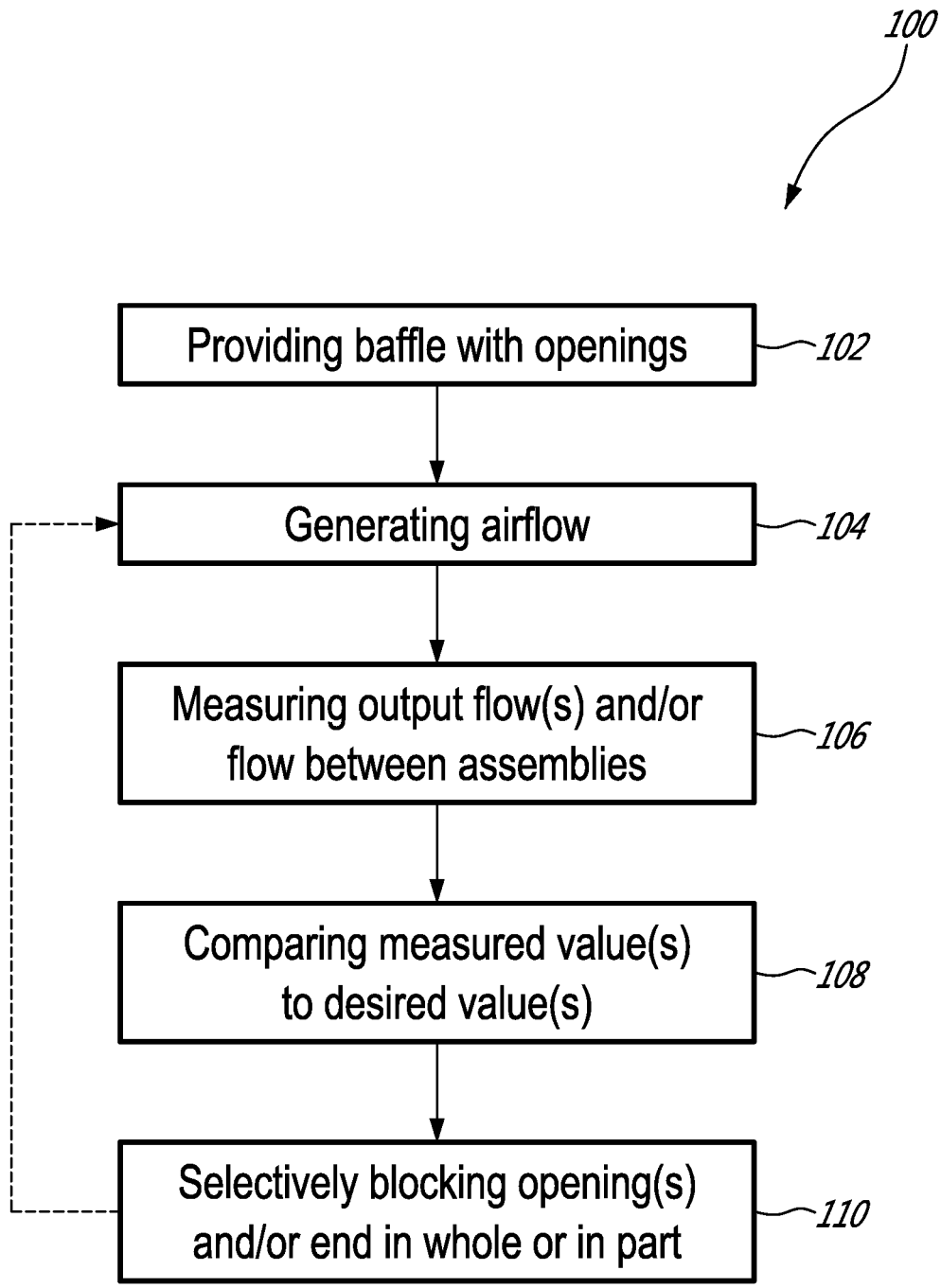
FIG. 7 is a flowchart of a method of balancing flows in a flow distribution assembly such as shown in FIG. 3, in accordance with a particular embodiment.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION

Referring to the drawings and more particularly to FIG. 1, an aircraft is shown at 1 and is generally described to illustrate some components for reference purposes in the present disclosure. The aircraft 1 has a fuselage 2 having a fore end at which a cockpit is located, and an aft end supporting a tail assembly, with the cabin 2a generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft. It is also understood that although FIG. 1 shows a commercial aircraft, the aircraft 1 may alternately be any other type of aircraft, including, but not limited to, a business aircraft or a private aircraft.

Referring to FIG. 2, the cabin 2a includes flow distribution assemblies 10' to provide an airflow (pressurized or ambient air) into the cabin interior. The flow distribution assemblies 10' are configured to provide adequate air circulation, for example to meet applicable certification requirements. In the embodiment shown, two overhead flow distribution assemblies 10' are provided, one extending on each side of the cabin 2a along the longitudinal direction L (FIG. 1) of the aircraft 1. Each overhead flow distribution assembly 10' forms part of an overhead storage bin which is suitably secured to the wall structure of the fuselage 2 over the passenger seats 8. Each flow distribution assembly 10' provides an upper flow 12, or upwash, directed generally laterally within the top of the cabin 2a, for example toward the central aisle in proximity of a ceiling surface, and a lower flow 14, or downwash, directed generally downwardly in proximity of a wall surface, toward the seats 8. A suitable ratio must typically be maintained between the upper and lower flow 12, 14 in order to ensure adequate air circulation.

Referring to FIG. 3, a flow distribution assembly 10 in accordance with a particular embodiment is schematically shown, which may be installed similarly to the flow distribution assembly 10' described above. In this embodiment, the flow distribution assembly 10 includes conduits 16, 18 configured as valances to be suitably secured to the wall structure of the fuselage 2 over the passenger seats 8 (FIG. 2), i.e. the flow distribution assembly 10 is not integrated with storage bins; other configurations are possible. Each conduit 16, 18 includes upper outlets 20 spaced apart from each other along the longitudinal direction L and configured for distribution of the upper flow 12 (upwash) and lower outlets 22 spaced apart from each other along the longitudinal direction L and configured for the distribution of the lower flow 14 (downwash).

In the embodiment shown, a primary conduit 16 receives an incoming airflow from a suitable source (not shown) via one or more inlets 24a. The primary conduit 16 is located between secondary (front and aft) conduits 18 along the longitudinal direction L; each of the secondary conduits 18 includes an inlet 24b in fluid communication with the primary conduit 16 for receiving a flow therefrom. It is understood that other configurations are also possible, including, but not limited to, a single conduit receiving flow from a primary conduit, more than one primary conduits, additional conduit(s) receiving flow from one or more secondary conduit(s), all conduits being individually fed from the source (i.e. being primary conduits), etc. Moreover, the conduits 16, 18 may have different dimensions (e.g. longitudinal dimension) and/or different configurations from one another.

Referring to FIGS. 4-5, the primary conduit 16 in accordance with a particular embodiment is generally shown. The primary conduit 16 defines a plenum 26, with the inlet 24a (FIG. 5), the upper outlets 20 and the lower outlets 22 in fluid communication with the plenum 26. The inlet 24a is located between the upper outlets 20 and the lower outlets 22 along a transverse direction T normal to the longitudinal direction L.

The conduit 16 has interconnected walls surrounding the plenum 26; the interconnected walls include longitudinal walls which, when installed, extend along the longitudinal direction L of the aircraft, and opposed end walls 44 (FIG. 4) spaced apart along the longitudinal direction L. It is understood that the term "wall" as used herein is intended to include, but not to be limited to, a monolithic element formed separately from adjacent walls, an element formed of two or more interconnected panels, and an element forming part of a monolithic structure including two or more adjacent walls.

In the embodiment shown, the longitudinal walls include an upper wall 28 extending along a width of the conduit 16, and which in use defines a top surface of the conduit 16. Referring to FIG. 5, the upper wall 28 has a central section 28c extending between an inner section 28i and an outer section 28o, the inner and outer sections 28i, 28o angled with respect to the central section 28c so that the upper wall 28 defines a "C" shape. The inlet 24a is defined by one or more openings through the central section 28c of the upper wall 28. The inner section 28i of the upper wall 28 has an array of slots 20s defined therethrough, which define the upper outlets 20 in fluid communication with the plenum 26.

In the embodiment shown, the upper wall 28 includes two panels: an inner panel 30i including the inner section 28i and an adjacent part of the central section 28c, and an outer panel 30o including the remainder of the central section 28c and the outer section 28o, with the inlet 24a being defined through the outer panel 30o. In a particular embodiment, the inner panel 30i is detachable at least in part from the remainder of the conduit 16, so as to provide access to the plenum 26.

In the embodiment shown, the longitudinal walls also include an arcuate wall 32 extending from the inner section 28i of the upper wall 28, with a concave side of the arcuate wall 32 facing the central section 28c of the upper wall 28. The arcuate wall 32, inner section 28i and part of the central section 28c cooperate to surround a first portion 26a of the plenum 26. The upper outlets 20 are in direct fluid communication with the first portion 26a of the plenum 26.

In the embodiment shown and as can be seen in FIG. 5, the longitudinal walls also include an intermediate wall 34 and a lower wall 36. The intermediate wall 34 extends spaced apart from the central section 28c of the upper wall 28, from an outer edge of the arcuate wall 32. Outer edges of the intermediate wall 34 and of the outer section 28o of the upper wall 28 are interconnected by the lower wall 36, which is spaced apart from the inner section 28i of the upper wall 28 along the transverse direction T and, in the embodiment shown, not parallel thereto. The lower wall 36 has an array of slots 22s defined therethrough which define the lower outlets 22 in fluid communication with the plenum 26. The intermediate wall 34, remainder of the central section 28c, outer section 28o, and lower wall 36 cooperate to surround a second portion 26b of the plenum 26. The inlet 24a is in direct fluid communication with the second portion 26b of the plenum 26 and the lower outlets 22 are fed by the second portion 26b of the plenum 26. In the embodiment shown and as can be best seen in FIG. 4, the second portion 26b of the plenum 26 includes partitions 38 spaced apart from each other along the longitudinal direction L, and extending between the upper wall 28 and intermediate wall 34.

It can be seen in FIG. 5 that a maximum distance D1 between the arcuate wall 32 and upper wall 28 is greater than a maximum distance D2 between the intermediate wall 34 and upper wall 28; the second portion 26b of the plenum 26 defines a flow restriction with respect to the first portion 26a.

Still referring to FIG. 5, the conduit 16 may also include lower outlet duct(s) 40 extending from the lower outlets 22, for example to redirect the flow out of the lower outlets to a desired direction. In the embodiment shown, the outlet duct(s) 40 turn the flow out of the lower outlets 22 such that it is directed substantially toward or perpendicular to a side panel of the aircraft. Other configurations are also possible.

The primary conduit 16 also includes end outlets 42 for fluid communication with the adjacent secondary conduits 18. In the embodiment shown, opposed end walls 44 (FIG. 4) each include at least one opening defining an end outlet 42 at each of the front end and the rear end of the primary conduit. For example, the entire "D" shape defined by the cooperating arcuate and upper walls 32, 28 may define open ends. Other configurations are also possible.

The conduit 16 includes additional walls which are not described in detail herein, configured for example to provide a desired appearance to the exterior of the conduit, to define a storage compartment, to define additional ducting for air circulation or for receiving components of the aircraft, etc.

Still referring to FIGS. 4-5, the primary conduit includes a baffle 50 received in the plenum 26, which in a particular embodiment helps improve the balance of the flow between the interconnected conduits 16, 18 of the flow distribution assembly 10 and between the upper and lower outlets 20, 22. The baffle 50 extends within the first portion 26a of the plenum 26 along the longitudinal direction L, and is located between the upper outlets 20 and the inlet 24a along the transverse direction T (see FIG. 5). The baffle 50 thus defines a longitudinally extending partition in the plenum 26, with the upper outlets 20 being located on one side of the partition, and with the lower outlets 22 and the inlet 24a being located on the opposed side of the partition. The baffle 50 has openings 52 defined therethrough, and is configured to restrict the airflow from the inlet 24a toward the upper outlets 20. In a particular embodiment, the baffle 50 is located and configured so that all of the airflow circulating between the inlet 24a and the upper outlets 20 circulates through the openings 52 of the baffle 50.

Referring particularly to FIG. 5, in the embodiment shown the baffle 50 is connected (e.g. removably connected) to the inner panel 30i of the upper wall 28 and has a zig-zag shape defined by five (5) serially connected longitudinal walls. A first wall 50a abuts and is connected to the inner section 28i of the upper wall 28 such that the upper outlets 20 are located between the first wall 50a of the baffle 50 and the central section 28c of the upper wall 28. A second wall 50b extends from the first wall 50a away from the inner section 28i of the upper wall 28 and is slightly angled toward the central section 28c of the upper wall 28. A third wall 50c extends from the second wall 50b and is angled away from the central section 28c of the upper wall 28, with the openings 52 of the baffle 50 being defined through the third wall 50c. A fourth wall 50d extends from the third wall 50c and is angled toward the central section 28c of the upper wall 28. A fifth wall 50e extends from the fourth wall 50d, and abuts and is connected to the central section 28c of the upper wall 28, spaced from the inner section 28i. Other configurations are possible. In the embodiment shown, the removable/openable inner panel 30i of the upper wall 28 allows for the baffle 50 to be easily installed and removed from the plenum 26, and allows for the baffle 50 to be easily accessed for modification, such as described further below.

Referring to FIG. 6, the secondary conduit 18 in accordance with a particular embodiment is generally shown, where elements similar or identical to corresponding elements of the primary conduit 16 of FIGS. 3-4 are designated by the same reference numeral and will not be further described herein. The inlet 24b of the secondary conduit 18 is not defined by an opening through the upper wall 28, but rather by at least one opening defined through one of the opposed end walls 44 (FIG. 3) of the conduit 18; the inlet 24b is complementary to and in alignment with the adjacent end outlet 42 of the primary conduit 16, such as to be connected thereto in suitable manner (for example via a suitable duct). Accordingly, in the embodiment shown, the entire "D" shape defined by the cooperating arcuate and upper walls 32, 28 defines an open end forming the inlet 24b. The inlet 24b is thus located in close proximity to the upper outlets 20; a distance measured along the transverse direction T between the upper outlets and the inlet (in the embodiment shown being zero, so not illustrated) is smaller than a distance D3 measured along the transverse direction T between the lower outlets 22 and the inlet 24b. Other configurations are also possible.

The baffle 50 is located between the upper outlets 20 and at least part of the inlet 24b along the transverse direction T, and is configured to restrict the airflow from the at least part of the inlet 24b toward the upper outlets 20. In the embodiment shown, the baffle 50 has an end extending across the inlet 24b, so that the baffle 50 restricts only the flow from part of the inlet 24b, for example a major part of the inlet 24b, to the upper outlets 20.

Accordingly, in a particular embodiment, the primary conduit 16 is located between two secondary conduits 18 as shown in FIG. 3. The baffle 50 of the primary conduit 16 (FIG. 5) extends between the inlet 24a and the upper outlets 20 of the primary conduit 16, and the baffle 50 of each secondary conduit 18 (FIG. 6) extends across the inlet 24b of the respective conduit 18, between the upper outlets 20 and part of the inlet 24b of the respective conduit 18. In a particular embodiment, the flow tends to favor the upper outlets 20 over the lower outlets 22 since the path of least resistance from the inlets 24a, 24b is toward the upper outlets 20 rather than toward the lower outlets 22: the second portion 26b of the plenum 26 feeding the lower outlets 22 defines a flow restriction with respect to the first portion 26a of the plenum 26 feeding the upper outlets 20 and, in the case of the secondary conduits 18, the inlet 24b is located in close proximity to the outer outlets 20. The inclusion of the baffle 50 in each of the conduits 16, 18 creates a flow restriction between the respective inlet 24a, 24b and upper outlets 20 and compensates for that effect so as to obtain a desired ratio between the upper and lower flows out of the upper and lower outlets 20, 22.

Referring to FIG. 7, the position and size of the openings 52 defined in the baffle 50 are configured so as to obtain a desired flow restriction between the inlet 24a, 24b and the upper outlets 20, in order to obtain a desired balance of flow between the upper and lower outlets 20, 22. For example, in a particular embodiment and as illustrated by method 100, the flow between upper outlets and lower outlets is balanced by first providing the baffle 50 with the openings 52 having a predetermined size, as shown in 102. In this initial configuration and referring to FIG. 8a, the openings 52 may be regularly spaced apart and all have an identical shape and cross-sectional area; the cross-sectional area of the openings 52 may be selected for example to correspond to a maximum cross-sectional area allowed by structural considerations. In the particular configuration shown, each opening 52 is aligned with three (3) of the upper outlets 20. Other configurations are also possible.

Referring back to FIG. 7, the airflow is then generated into each conduit 16, 18 via its inlet 24a, 24b, as shown in 104. In the embodiment of FIG. 3, this includes flowing air into the primary conduit 16 via its inlet 24a, and from the primary conduit 16 into the secondary conduits 18 via their respective inlet 24b in fluid communication with the primary conduit 16.

Output flow(s) is/are measured for each of the conduits 16, 18, as shown in 106. Measurements are taken at different locations spaced apart along the longitudinal axis L for each of the conduits 16, 18, such as to determine the flow distribution along the length of the conduit 16, 18. Measuring the flow can include, but is not limited to, measuring the velocity of the flow (e.g. in cubic feet per minute or CFM). The upper output flow out of the upper outlets 20 and/or the lower output flow out of the lower outlets 22 may be measured. In a particular embodiment, the upper output flow out of each of the upper outlets 20 and/or the lower output flow out of each of the lower outlets 22 are measured.

The measured output flows are then each compared to a corresponding desired output flow representing a desired or target flow distribution along the longitudinal direction L, as shown in 108. The desired output flow may be defined as, for example, an acceptable range, an acceptable minimum value, or an acceptable maximum value.

In a particular embodiment, the flow between the adjacent conduits 16, 18 (e.g. from the primary conduit 16 through the inlet 24b of each of the secondary conduits 18) is also measured in step 106, and compared to a desired flow for each of the inlets 24b of the secondary conduits 18, representing a desired or target flow distribution between the adjacent conduits 16, 18 in step 108. The desired flow through the inlet 24b may be defined as, for example, an acceptable range, an acceptable minimum value, or an acceptable maximum value.

Based on the comparison, one or more of the openings 52 of the baffle 50 are selectively blocked, in whole or in part, such as to reduce a difference between the measured flow(s) and the corresponding desired flow(s), as shown in 110. The process may be iterative, e.g. once the opening(s) 52 are blocked, the flow into each conduit 16, 18 may again be generated (or maintained), and the output flow(s) and/or inlet flow(s) into the secondary conduits 18 may be measured again and compared to the corresponding desired flow(s), so that additional openings 52 may be selectively blocked, in whole or in part, to further reduce the difference between the measured flow(s) and the corresponding desired flow(s). In a particular embodiment, blocking a greater area of the baffle openings 52 allows for a greater proportion of the total output flow of a given conduit 16, 18 to flow out of the lower outlets 22 and/or allows for a reduction of the flow out of the upper outlets 22 adjacent the blocked opening(s) 52. In a particular embodiment, blocking a greater area of the baffle openings 52 in one conduit as compared to an adjacent conduit allows for an increase in the total output flow and/or upper output flow in the conduit where the baffle 50 provides a lower restriction to the flow (i.e. has a greater cross-sectional area of openings 52) relative to the conduit where the baffle 50 provides a greater restriction to the flow.

FIGS. 8b and 8c show examples of baffle configurations obtained after selectively blocking in whole or in part some of the openings 52 of the baffle 50 of FIG. 8a. It can be seen that some of the upper outlets 20 are aligned with or in proximity of a baffle opening 52, while some are not. The baffle 50 in FIG. 8b includes fewer openings 52 than the baffle 50 in FIG. 8c, and in a particular embodiment the baffle 50 of FIG. 8b is provided in a primary conduit 16 while the baffle 50 of FIG. 8c is provided in a secondary conduit 18. In a particular embodiment, the openings 52 of the baffle 50 are blocked in proximity of the inlet 24a, 24b, so as to block a direct route from the inlet 24a, 24b to the upper outlets 20 and help promote distribution of the flow to all of the outlets 20, 22. It is understood that the baffle opening configurations shown here are exemplary only and that alternate baffle opening configurations are also possible.

In a particular embodiment, the openings 52 of the baffles 50 are selectively blocked until one or more, for example all, of the following requirements are met: uniform or as uniform as possible flow distribution along the longitudinal direction L for each conduit 16, 18, for the upper output flow and/or lower output flow; predetermined average flow obtained for the upper output flow and/or lower output flow in each of the conduits 16, 18; uniform or as uniform as possible flow distribution between adjacent conduits 16, 18; target flow value reached for the flow distribution between adjacent conduits 16, 18; about 80% of the flow out of each conduit 16, 18 being provided via the upper outlets 20, with the remaining 20% being provided out of the lower outlets 22. Other suitable criteria may alternately be used.

Figure 9C:
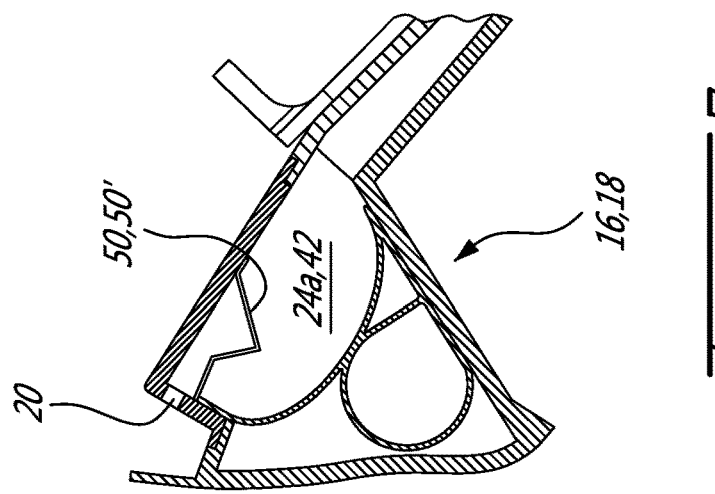
FIG. 9c is a schematic cross-sectional view of part of the conduit of FIG. 5 or FIG. 6, including a baffle having an open end, in accordance with another particular embodiment.
Figure 9B:
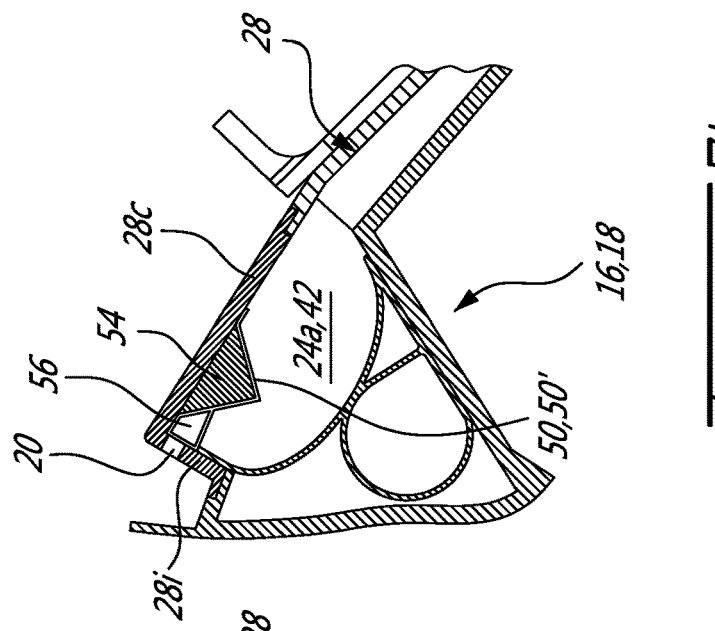
FIG. 9b is a schematic cross-sectional view of part of the conduit of FIG. 5 or FIG. 6, including a baffle end wall closing part of the end of the baffle, in accordance with another particular embodiment.
Figure 9A:
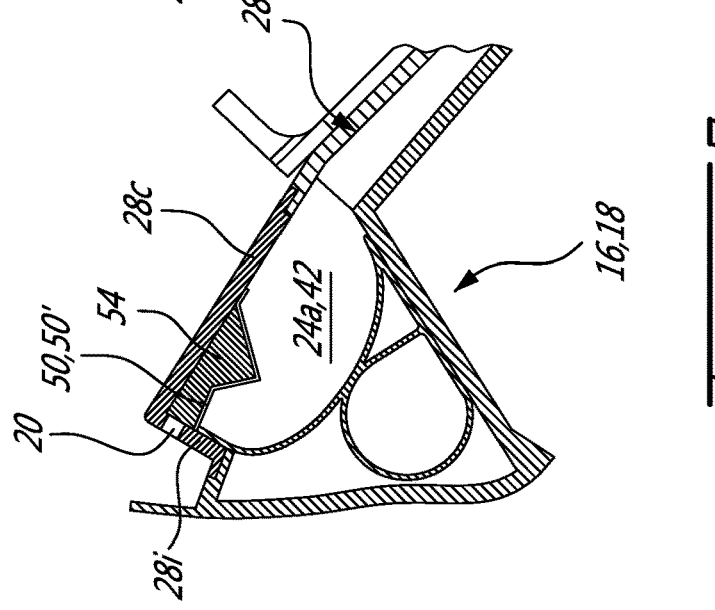
FIG. 9a is a schematic cross-sectional view of part of the conduit of FIG. 5 or FIG. 6, including a baffle end wall closing one end of the baffle, in accordance with a particular embodiment.

Referring to FIGS. 9a-9c, the baffle ends can also be used to affect the longitudinal balance of flow between the adjacent conduits 16, 18 or within a conduit 16, 18. The baffle 50 can be provided as a single member extending longitudinally along the length covered by the upper outlets 20 (see e.g. FIG. 8c) or by two or more separate sections 50' together extending longitudinally along the length covered by the upper outlets 20 (see e.g. FIG. 8b). As illustrated by FIGS. 9a-9b, the baffle 50 may include a baffle end wall 54 extending transversely to the longitudinal direction L and connected to the end of the baffle 50 or the end of a section 50' of the baffle 50, so as to obstruct the flow longitudinally. As shown in FIG. 9c, the baffle end wall may be omitted.

As shown in FIG. 9a, the baffle end wall 54 may block the entire portion of the cross-section of the conduit 16, 18 located on the same side of the baffle 50 as the upper outlets 20. Accordingly, the end wall 54 blocks the entire portion of the inlet 24b located on the same side of the baffle 50 as the upper outlets 20 for the secondary conduit 18, and/or the entire portion of the end outlet 42 located on the same side of the baffle 50 as the upper outlets 20 for the primary conduit 16. In the embodiment shown, the baffle end wall 54 is being connected to the inner section 28i and the central section 28c of the upper wall 28.

As shown in FIG. 9b, the baffle end wall 54 may block only a part of the portion of the cross-section of the conduit 16, 18 located on the same side of the baffle 50 as the upper outlets 20. Accordingly, the end wall 54 blocks only part of the inlet 24b located on the same side of the baffle 50 as the upper outlets 20 for the secondary conduit 18, and/or the only part of the end outlet 42 located on the same side of the baffle 50 as the upper outlets 20 for the primary conduit 16. In the embodiment shown, the baffle end wall 54 is connected to the central section 28c of the upper wall 28 while leaving a gap 56 between the baffle end wall 54 and the inner section 28i of the upper wall 28.

Accordingly, referring back to FIG. 7, in a particular embodiment where the flow between the adjacent conduits 16, 18 (e.g. from the primary conduit 16 through the inlet 24b of each of the secondary conduits 18) is measured in 106 and compared to a desired flow corresponding to a desired or target flow distribution between the adjacent conduits 16, 18 in 108, the baffle end extending across the communication between the adjacent conduits 16, 18 may be used to selectively block part of the inlet 24b of the secondary conduit 18 by varying a size of the baffle end wall 54, such as to reduce a difference between the measured flow and the desired flow with no or minimal impact on the upper/lower output flow ratio, as part of step 110. The end of a baffle segment 50' extending inside a conduit, for example at or about the center of the conduit, may also be selectively blocked with a baffle end wall 54 to reduce a difference between the output flows on the opposed sides of the end of the baffle segment 50', if necessary.

In a particular embodiment, the baffle opening configuration is determined through testing by selectively blocking the openings 52 in a temporary manner (e.g. using a suitable type of removable blocking member such as tape). Once the baffle opening configuration is determined for a particular cabin interior and conduit configuration, a baffle can be manufactured with a permanent opening configuration corresponding to the temporary opening configuration determined during testing, and installed in the conduit 16, 18.

In a particular embodiment, the baffle 50 may be used to adapt a flow distribution assembly 10 designed for a particular cabin interior to be used in a different cabin interior, for example in the case of a redesign of a cabin interior affecting the size of the overhead storage compartments and/or valances. The baffle 50 may also allow a flow distribution assembly 10 designed for a particular aircraft to be used in another aircraft, with different baffle opening configurations being selected for the different aircraft. In a particular embodiment, the baffle 50 is easily installed and can be retrofitted in existing flow distribution assemblies 10.

In a particular embodiment, the baffle 50 allows for a fine tuning of the local flow distribution along the longitudinal direction L; the selective blocking of the baffle openings 52 allows for the flow distribution to be adjusted at the required location along the longitudinal axis L of the flow distribution assembly 10, thus allowing adjustment across a length of a conduit 16, 18 as well as between adjacent conduits 16, 18.

In a particular embodiment, the baffle 50 allows for an easy installation on the aircraft for testing and for a quick optimization of the flow distribution during the tests, since only a selective blocking of the baffle openings 52 is required to change the flow distribution across the flow distribution assembly 10.

In a particular embodiment, the baffle 50 allows to improve passenger comfort by reducing the flow out of the upper outlets 20 ("upwash"), as compared to the same flow distribution assembly 10 without a baffle 50.

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:
1. An overhead flow distribution assembly for an aircraft cabin, the assembly comprising:
 a first conduit defining a first plenum having:
  first upper outlets spaced apart from each other along a longitudinal direction of the aircraft;
  first lower outlets spaced apart from each other along the longitudinal direction; and
  a first inlet between the first upper outlets and the first lower outlets, wherein the first inlet is defined by at least one opening though a wall of the first conduit extending along the longitudinal direction;
 a first baffle:
  that extends within the first plenum along the longitudinal direction,
  that is disposed between the first upper outlets and the first inlet along a transverse direction normal to the longitudinal direction,
  that has openings defined therethrough, and
  that is configured to restrict airflow from the first inlet toward the first upper outlets;
 a second conduit:
  that is disposed adjacent the first conduit in the longitudinal direction and extends along the longitudinal direction, and
  that defines a second plenum having:
   second upper outlets spaced apart from each other along the longitudinal direction;
   second lower outlets spaced apart from each other along the longitudinal direction; and
   a second inlet disposed between the second upper outlets and the second lower outlets and in an end of the second conduit adjacent the first conduit and that defines a fluid communication between the first plenum and the second plenum; and
 a second baffle:
  that extends along the longitudinal direction within the second plenum,
  that is disposed between the second upper outlets and at least part of the second inlet along the transverse direction,
  that has openings defined therethrough, and
  that is configured to restrict airflow from the second inlet toward the second upper outlets.

2. The assembly according to claim 1, wherein
the first upper outlets and the second upper outlets are defined by a first array of slots through a first wall extending along the longitudinal direction, and
the first lower outlets and the second lower outlets are defined by a second array of slots through a second wall extending along the longitudinal direction.

3. The assembly according to claim 2, wherein
the first conduit has a plurality of interconnected walls including:
 longitudinal walls configured to extend along a longitudinal direction of the aircraft; and
 opposed end walls spaced apart along the longitudinal direction,
the interconnected walls cooperates to define the first plenum,
one of the interconnected walls has the first inlet defined therethrough in fluid communication with the first plenum,
the longitudinal walls includes first and second longitudinal walls spaced apart from each other along the transverse direction,
the first inlet is disposed between the first and second longitudinal walls, the first longitudinal wall has a first plurality of slots defined therethrough defining the first upper outlets in fluid communication with the first plenum, the second longitudinal wall has a second plurality of slots defined therethrough defining the first lower outlets in fluid communication with the first plenum, the first baffle defines a longitudinally extending partition in the first plenum, the first upper outlets is disposed on one side of the partition, the first lower outlets and at least part of the first inlet are disposed on an opposed side of the partition, the baffle has openings defined therethrough, the baffle is configured to restrict an airflow from the at least part of the first inlet toward the first upper outlets.

4. The assembly according to claim 3, wherein the first baffle is connected to the first longitudinal wall and to a third one of the longitudinal walls disposed between the first and second longitudinal walls.

5. The assembly according to claim 4, wherein the first inlet is defined by at least one opening through the third longitudinal wall.

6. The assembly according to claim 3, wherein the second inlet is defined by at least one opening through one of the opposed end walls.

7. The assembly according to claim 1, wherein each of the first plenum and the second plenum includes:
  a first portion adjacent the corresponding upper outlets: and
  a second portion extending from the first portion to the corresponding lower outlets and defining a flow restriction with respect to the first portion, and
the baffle extends within the first portion.

8. The assembly according to claim 7, wherein
the first inlet is in direct fluid communication with the second portion of the first plenum, and
the second inlet is in direct fluid communication with the second portion of the second plenum.

9. The assembly according to claim 1, wherein
the second conduit has two opposed ends spaced apart along the longitudinal direction, and
one of the opposed ends includes the second inlet.

10. The assembly according to claim 9, wherein a first distance measured along the transverse direction between the second upper outlets and the second inlet is smaller than a second distance measured along the transverse direction between the second lower outlets and the second inlet.

11. The assembly according to claim 9, wherein
the second baffle has an end extending across the second inlet,
the second baffle comprises a baffle end wall extending transversely to the longitudinal direction and connected to the end of the second baffle, and
the baffle end wall obstructs part of the inlet.

12. The assembly according to claim 1, wherein
the second baffle has an end extending across the second inlet,
the second baffle further comprises an end wall extending transversely to the longitudinal direction and connected to the end of the second baffle, and
the end wall obstructs part of the second inlet.

13. The assembly according to claim 1, further comprising:

a third conduit:
  that is disposed such that the first conduit is disposed between the second and third conduits along the longitudinal direction, and
  that defines a third plenum having:
    third upper outlets spaced apart from each other along the longitudinal direction;
    third lower outlets spaced apart from each other along the longitudinal direction; and
    a third inlet between the third upper outlets and the third lower outlets along the transverse direction and in an end of the third conduit adjacent the first conduit and that defines a fluid communication between the first plenum and the third plenum; and a third baffle:
  that extends along the longitudinal direction within the third plenum,
  that is disposed between the third upper outlets and at least part of the third inlet along the transverse direction,
  that has openings defined therethrough, and
  that is configured to restrict airflow from the third inlet toward the third upper outlets.

14. A method of balancing a flow in an overhead flow distribution assembly for an aircraft cabin, the method comprising:

providing a secondary conduit having:
  upper and lower outlets; and
  a baffle extending within the secondary conduit between the upper outlets and lower outlets with an end extending across an inlet of the secondary conduit,
  including locating the baffle to extend between the upper outlets and at least part of the inlet;

generating an airflow into the secondary conduit via a primary conduit that has upper and lower outlets and that is in fluid communication with the inlet so as to create a flow through openings in the baffle and out of the upper and lower outlets of the secondary conduit;

measuring an output flow out of at least one of the upper outlets and the lower outlets;

comparing the measured output flow to a corresponding desired output flow;

based on result of comparison of the measured output flow to the corresponding desired output flow, selectively blocking at least part of one or more of the openings of the baffle such as to reduce a difference between the measured output flow and the desired output flow;

measuring a flow from the primary conduit through the inlet of the secondary conduit;

comparing the measured flow to a desired flow; and based on result of comparison of the measured flow to the desired flow, selectively blocking part of the inlet with a wall attached to the end of the baffle such as to reduce a difference between the measured flow through the inlet and the desired flow through the inlet.

* * * * *